United States Patent [19]

Hartmann

[11] Patent Number: 4,716,777
[45] Date of Patent: Jan. 5, 1988

[54] MULTIPLE SPEED TRANSMISSION FOR PEDAL POWERED VEHICLES

[76] Inventor: Dirck T. Hartmann, 4121 Morningstar Dr., Huntington Beach, Calif. 92649

[21] Appl. No.: 860,981

[22] Filed: May 8, 1986

[51] Int. Cl.⁴ ............................................. F16H 3/08
[52] U.S. Cl. ........................................ 74/369; 74/372
[58] Field of Search ................ 74/369, 750 B, 371, 74/372, 363, 375, 331; 280/236, 238, 260

[56] References Cited

U.S. PATENT DOCUMENTS

| 609,664 | 8/1898 | Dibble | 280/260 |
|---|---|---|---|
| 619,118 | 2/1899 | Barnes | 280/260 |
| 666,438 | 1/1901 | Reenstierna | 74/371 |
| 707,359 | 8/1902 | Scharbach | 280/238 X |
| 1,093,920 | 4/1914 | Deves | 74/371 |
| 1,184,321 | 5/1916 | Chapin | 280/270 |
| 1,185,528 | 5/1916 | Oddie | 74/372 |
| 1,506,565 | 8/1924 | Clatworthy | 280/202 |
| 1,661,892 | 3/1928 | Girones | 74/371 |
| 1,798,384 | 3/1931 | Roberds | 280/260 |
| 1,862,993 | 6/1932 | Wise | 74/372 |
| 1,979,080 | 10/1934 | Roeder | 74/371 X |
| 2,366,912 | 1/1945 | Lauper | 74/375 X |
| 2,505,464 | 4/1950 | Debuit | 280/260 |
| 3,863,503 | 2/1975 | Loeb et al. | 280/238 X |
| 3,920,263 | 11/1975 | Bundschuh | 280/236 |
| 3,934,481 | 1/1976 | Foster | 280/236 X |
| 4,388,838 | 6/1983 | Richards et al. | 74/331 |
| 4,447,068 | 5/1984 | Brooks | 280/260 |
| 4,583,427 | 4/1986 | Blattmann | 74/750 B X |

FOREIGN PATENT DOCUMENTS

| 0158466 | 3/1985 | European Pat. Off. |
| 2610644 | 3/1976 | Fed. Rep. of Germany . |
| 771699 | 10/1934 | France | 74/372 |

Primary Examiner—Lawrence J. Staab
Assistant Examiner—David Novais

[57] ABSTRACT

A ten-speed transmission which is located inside the hub of the driving wheel of a pedal powered vehicle, and which includes a pedal drive shaft mounted in bearings on the axis of the wheel, is used to provide a compact, low maintenance alternative to the chain and derailleur system used for conventional multiple speed bicycles. Three idler shafts divide the pedal torque between three gear teeth permitting the gear widths to be one third that which would be required for a transmission using a single idler shaft. The resulting narrow gears coupled with a shift arrangement which adds nothing to the transmission width, permits the width between the pedals to be approximately that of a conventional chain driven bicycle. This transmission is particularly well suited for use in recumbent front wheel drive bicycles and tricycles.

11 Claims, 12 Drawing Figures

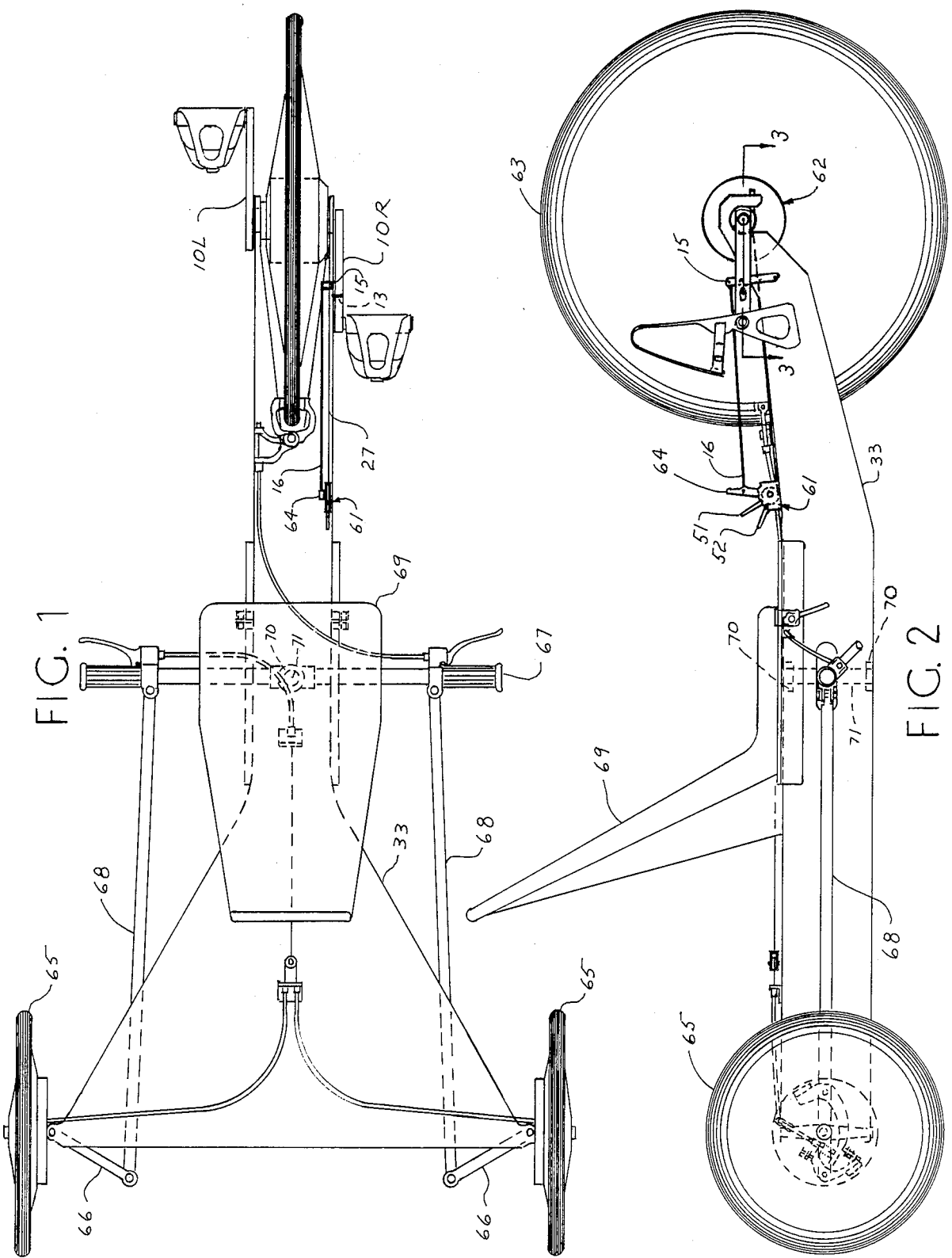

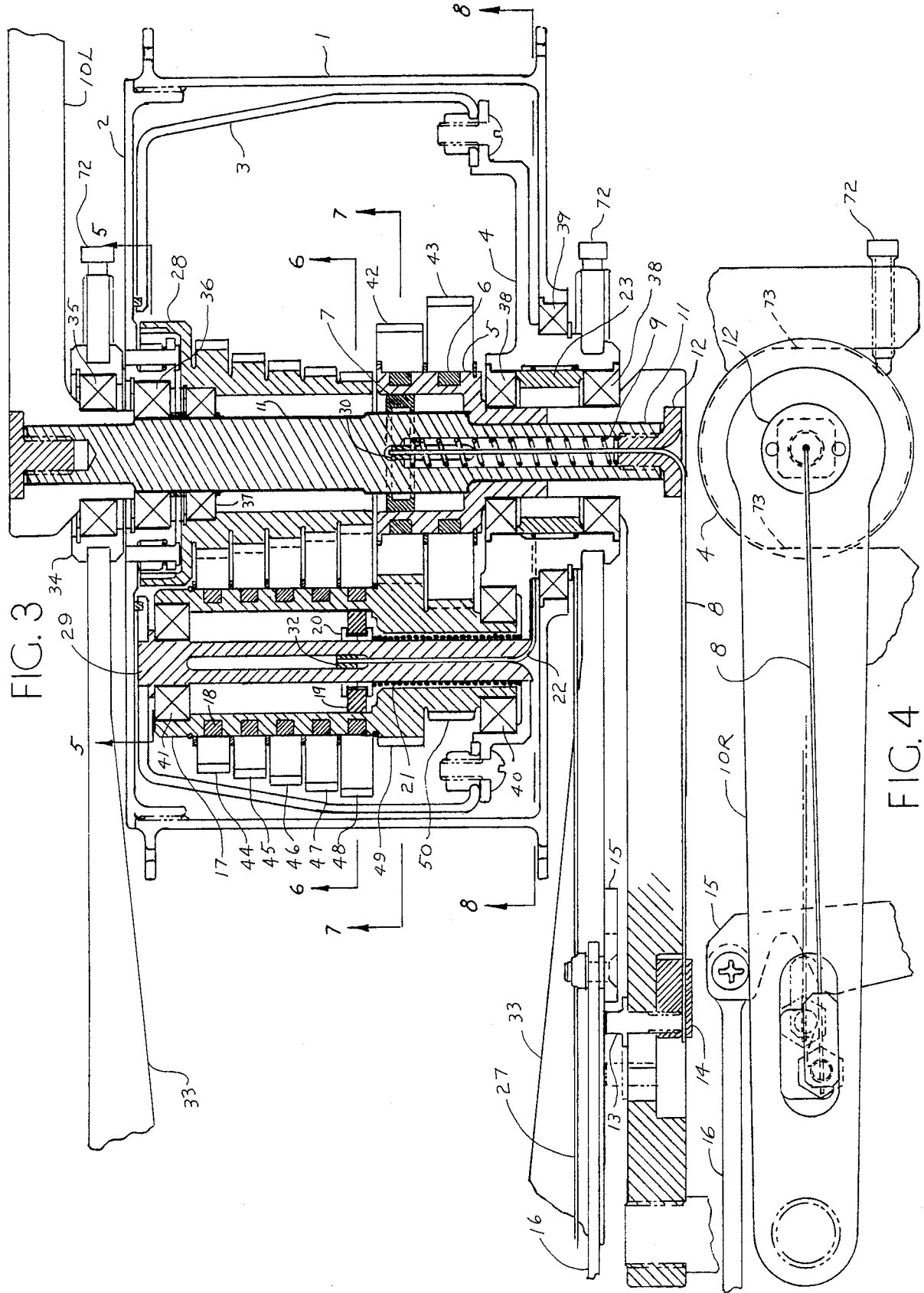

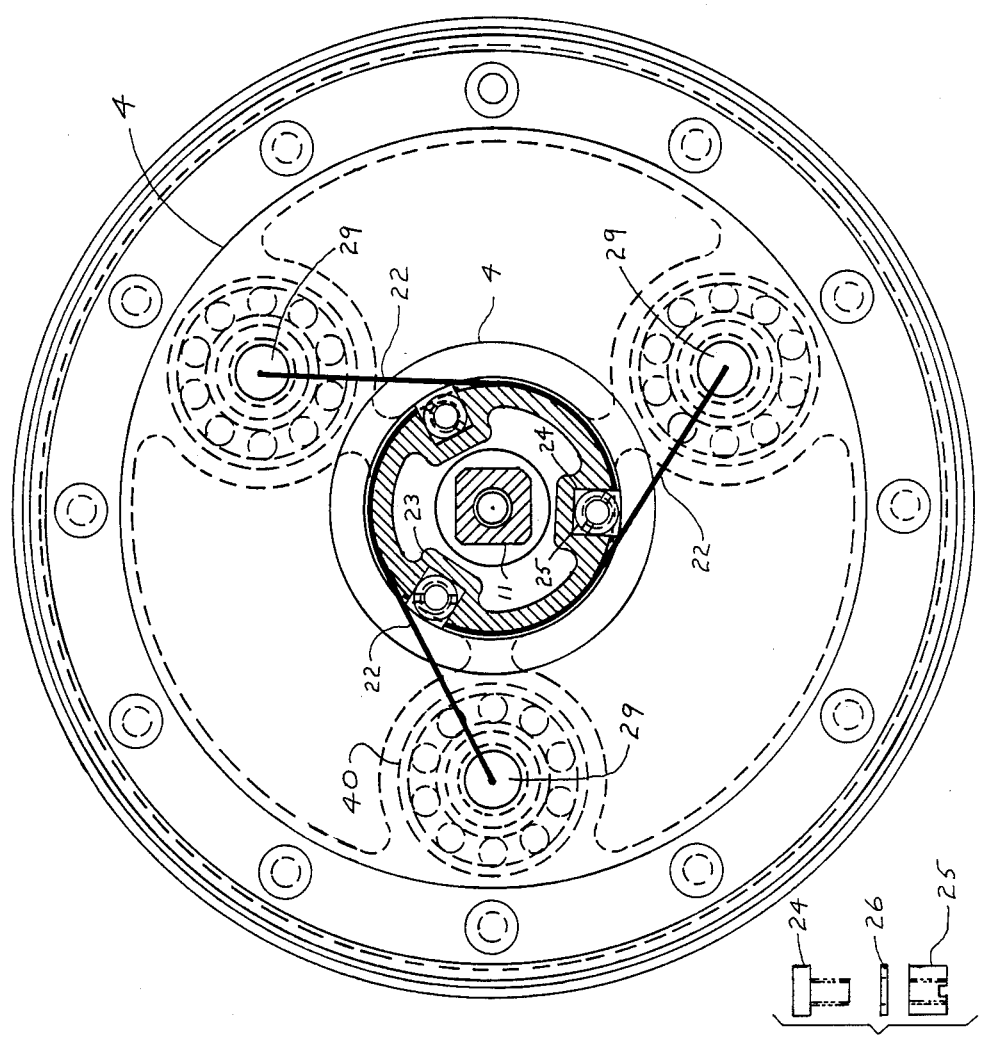
FIG 8
FIG 8A
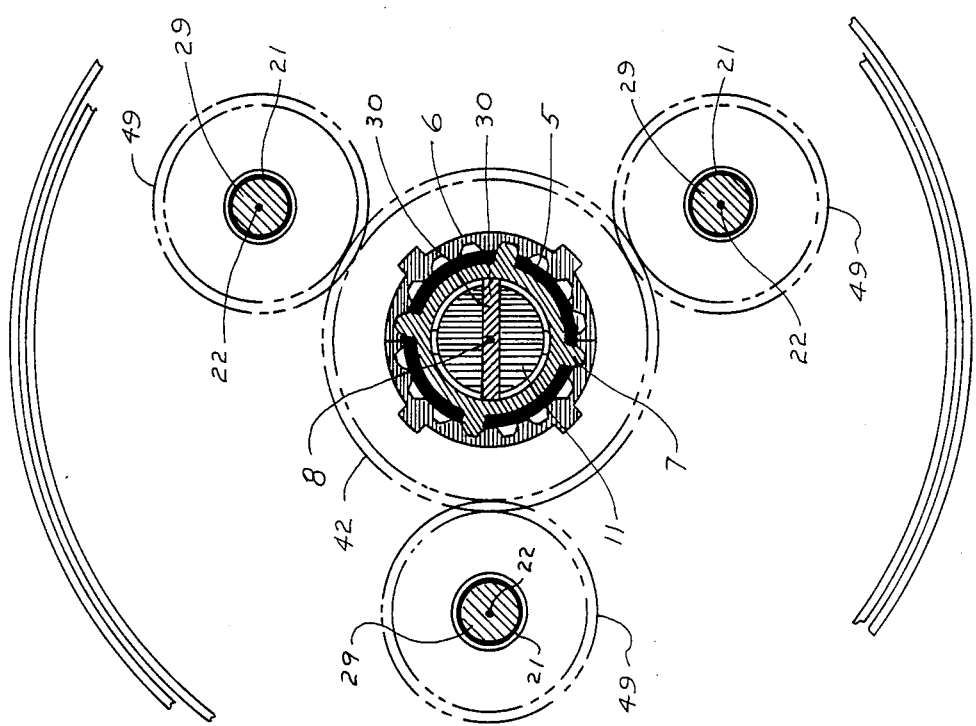
FIG 7

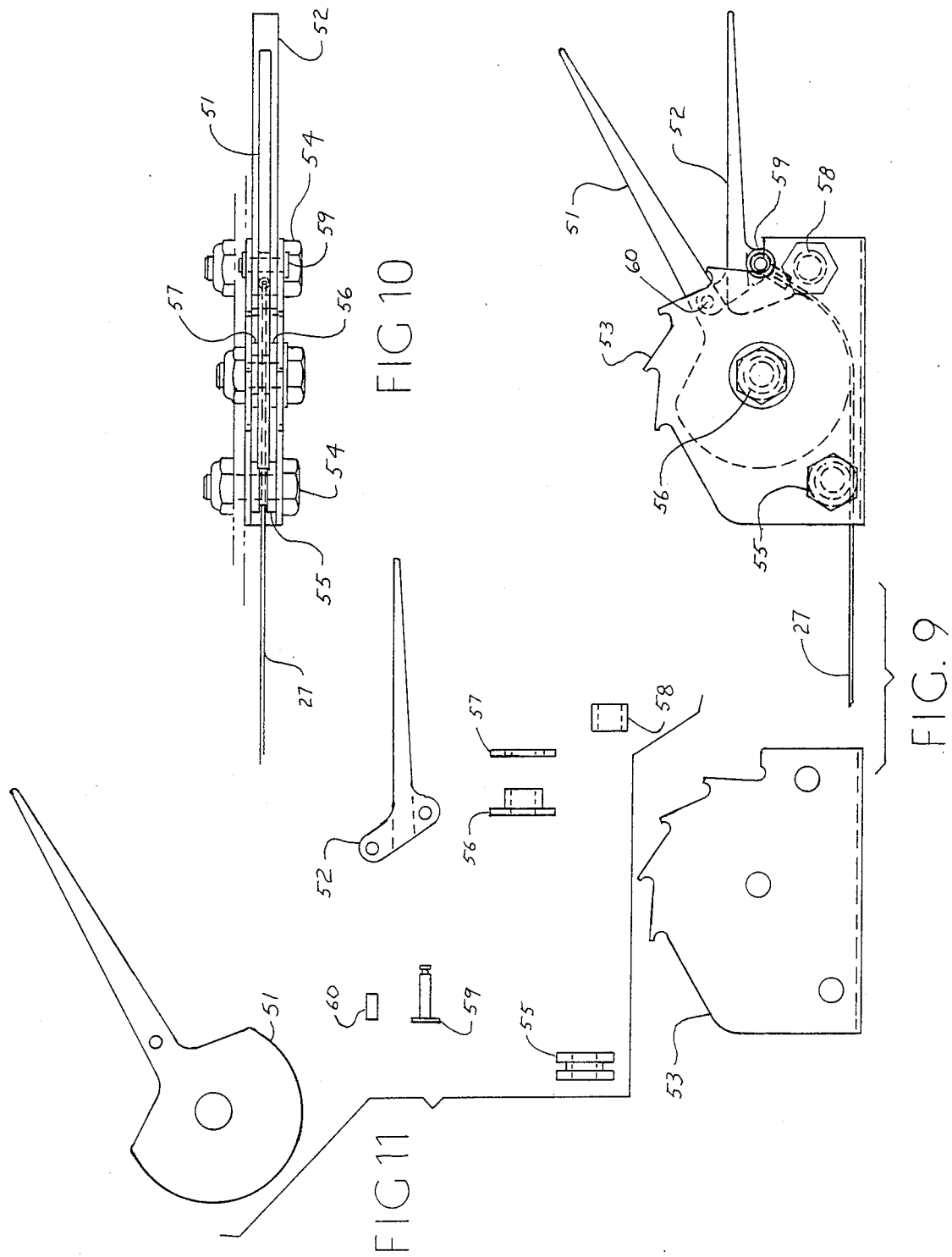

MULTIPLE SPEED TRANSMISSION FOR PEDAL POWERED VEHICLES

BACKGROUND OF THE INVENTION

1. Field of the Invention:

This invention relates generally to multiple speed transmissions for bicycles and tricycles, and more particularly to bicycle drive transmissions of the chainless type.

2. Description of the Prior Art:

A standard ten-speed bicycle uses a chain and derailleur system. The chain requires periodic cleaning and oiling for efficient operation and to prevent premature chain failure, and it must be removed from the rear sprocket to change the rear tire. Also, when the rider is bearing down on the pedals on a hill, the derailleur usually will not carry the chain to a lower gear. Consequently, with a chain derailleur/system, the cyclist must anticipate the terrain and shift gears before getting onto the hill in a gear that is too high, since he will not be able to shift to a lower gear once he is on the hill. Further, all the gears of a conventional ten-speed are not efficiently usable because of the angle the chain makes with the sprockets. In addition, shifting is not done in a simple set sequence that is easily mastered. These problems are eliminated with the present invention, as will be seen.

The transmission described in U.S. Pat. No. 2,505,464 by Debuit is located on the axis of the wheel concentric with the pedal drive shaft as is the present invention. However, Debuit's transmission carries the pedal torque through single gear teeth requiring heavy gears, is mounted alongside the wheel hub rather than inside it, is limited in the number of gear ratios it makes available (four plus a direct drive option), and uses rows of balls and internal pistons for locking the pinion gears mounted loose on a hollow axle to the axle. The arrangement does not appear to be practical because centrifugal force is continually pushing the balls outward into engagement with the pinions that are intended to slide freely on the hollow shaft.

SUMMARY OF THE INVENTION

An object of this invention is to provide a compact, durable, low maintenance, ten-speed alternative to the conventional chain/derailleur system, and which can be used for rear wheel drive bicycles and, more importantly, which can provide an efficient front wheel drive for comfortable, low drag, recumbent tricycles and bicycles.

Briefly, the transmission of this invention includes a gear case located inside the wheel hub with a cylindrical extension of the gear case fixed to the vehicle frame on one side; a pedal drive shaft mounted in ball bearings on the axis of the wheel; a drive-gear-carrier mounted on and driven by the pedal drive shaft; two drive gears freely rotating on the drive-gear-carrier with a means for selectively locking one or the other of them to the carrier; three idler shafts mounted parallel to the pedal drive shaft on bearings in the gear case; a pair of gears fixed to each idler shaft and in constant mesh with the two driving gears; five gears freely rotating on each idler shaft with a means for selectively locking the same one of them on each idler shaft to its respective shaft; a cluster of five gears rigidly joined together and mounted on a ball bearing on the pedal drive shaft, with each of the five gears in constant mesh with one gear on each of the three idler shafts; and with a conventional free-wheel ratchet mechanism driving the wheel hub from the five-gear-cluster.

The transmission provides speeds one through five with the smaller drive gear locked to the drive-gear-carrier, by sequentially locking the smallest to the largest of the five gears rotating freely on each idler shaft to its idler shaft, and speeds six through ten by going through the same sequence of locking gears to the idler shafts with the larger drive gear locked to the drive-gear-carrier.

BRIEF DESCRIPTION OF THE DRAWINGS

FIG. 1 is a plan view of a front wheel drive, rear wheel steer, recumbent tricycle, and incorporating the present transmission in the front wheel;

FIG. 2 is a side elevational view of the vehicle of FIG. 1;

FIG. 3 is a cross sectional view taken along the line 3—3 of FIG. 2;

FIG. 4 is a side elevational view of the right-side pedal crank arm;

FIG. 7 is a partial cross sectional view taken along the line 7—7 of FIG. 3;

FIG. 8 is a cross sectional view taken along the line 8—8 of FIG. 3;

FIG. 8A is an exploded view of the components for clamping cables to the winch;

FIG. 9 is a left side elevational view of the gear shift assembly;

FIG. 10 is a plan view of the gear shift assembly; and

FIG. 11 is an exploded view of the components of the gear shift assembly.

DESCRIPTION OF THE PREFERRED EMBODIMENTS

Figure 6:
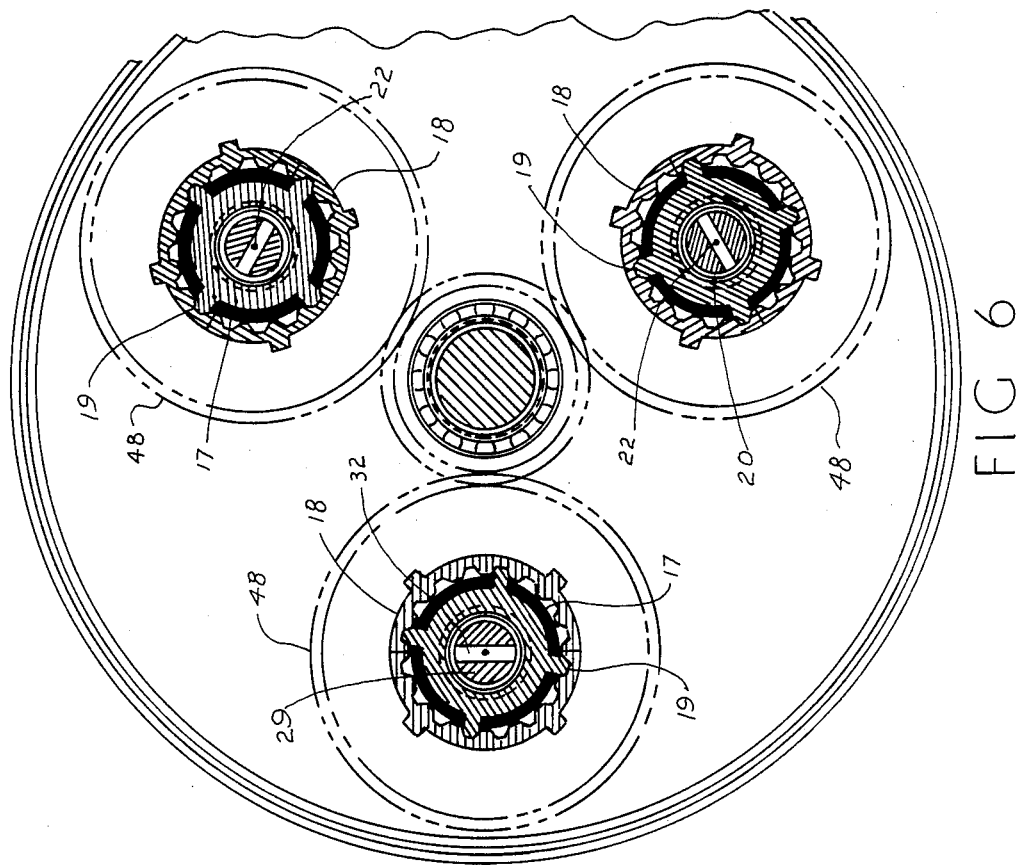
FIG. 6 is a cross sectional view taken along the line 6—6 of FIG. 3.

Referring to FIG. 3, the transmission in accordance with the present invention includes a wheel hub 1, a wheel hub driving plate 2, a gear case 3, a gear case closing plate 4, a drive-gear-carrier 5, a split ring 6, a drive gear selector 7, a selector actuation cable 8, a return spring 9, left and right pedal crank arms 10L and 10R, and a pedal drive shaft 11. The gear case closing plate 4 is supported by a pair of ball bearings 38, the inboard bearing 38 being seated on a cylindrical extension of the drive-gear-carrier 5, and the outboard bearing 38 being seated on a cylindrical extension of the pedal crank arm 10R.

As seen in FIGS. 3 and 7, the two halves of the split ring 6 are installed in each of a pair of circumferential cutouts in the drive-gear-carrier 5, with the outside diameter of the split ring 6 matching the outside diameter of the drive-gear-carrier 5. An involute gear 42 is installed over the split ring 6 in the left cutout, and an involute gear 43 is installed over the split ring 6 in the right cutout. The inside diameter of the gears 42 and 43 is a slip fit on the outside diameter of the drive-gear-carrier 5, so that the gears and split rings slide freely on the carrier. As seen in FIG. 7, the split ring 6 has four projections which key it to the gear inside of which it is installed.

The drive gear selector 7 is installed in the annular space between the outside diameter of the pedal drive shaft 11 and the inside diameter of the drive-gear-carrier 5. Four radial projections on the selector 7 slide in axial slots in the drive-gear-carrier 5 and engage an internal tooth form on the inside of the split ring 6 in the plane of which the selector 7 is located. The selector 7 thus transfers torque from the drive-gear-carrier 5 through the split ring 6 to the drive gear in the plane of the gear in which it is located.

As seen in FIGS. 3 and 4, the pedal drive shaft 11 has square ends for the transfer of torque from the pedal crank arms 10R and 10L to the drive-gear-carrier 5. The spanner bolt 12 fastens the crank arm 10R to the drive shaft 11 and, with the cylindrical extension on the crank arm 10R, keeps the drive-gear-carrier 5 firmly seated against a shoulder on the drive shaft 11.

The axial position of the drive gears 42 and 43 is maintained by a shoulder on the left end of the drive-gear-carrier 5, a washer between the gears, and a snap ring on the right end of the carrier 5. The axial position of the drive gear selector 7 is controlled by the shift bar 30, the cable 8, and the return spring 9. As seen in FIG. 7, the bar 30 fits in a slot through the drive shaft 11, with its ends captive between shoulders on the selector 7. The spring 9 forces the bar 30 to the left end of the slot. The spring force is resisted by the cable 8, one end of which is captive in the bar 30. From the bar 30, the cable 8 passes out through a hole in the spanner bolt 12 to a mounting block 14 in the crank arm 10R. A cable actuation pin 13 clamps the end of the cable 8 to the mounting block 14 and holds the block captive in the crank arm 10R. As seen in FIGS. 3 and 4, the pin 13 can be positioned by either one of two shoulders integrally machined in the crank arm 10R. An exposed length of the pin 13 inboard of the crank arm 10R permits engagement with the vehicle shift mechanism when the crank arm is in a horizontal position, as will be described.

As seen in FIGS. 1 and 2, the transmission 62 according to one embodiment of the present invention is installed in the front wheel 63 of a front wheel drive, rear wheel steer, recumbent tricycle, having a vehicle frame 33, rear wheels 65, steering knuckles 66, and handlebars 67. The handlebars are clamped to a center post 71 mounted in a pair of axially spaced bearings 70 under a seat 69. The handlebars are connected to the steering knuckles 66 by a pair of struts 68. The steering geometry is established to provide the proper toe-in on turns. A gear shift lever 64 is connected by an actuator rod 16 to a shift arm 15 which is pivoted from the frame 33.

As shown in FIGS. 2 and 4 a notch in the shift arm 15 can be pulled into engagement with the cable actuation pin 13 by the actuator rod 16 when the pedal crank arm 10R is properly positioned. By movement of the gear shift lever 64 coupled with a slight rocking of the pedal crank 10R, the cable actuation pin 13 can be moved between the retaining shoulders in the crank arm 10R, with the cable 8 moving the drive gear selector 7 from one to the other of the drive gears 42 and 43. When the gear shift lever 64 is released, a torsion spring on the pivot of the shift arm 15 swings it forward against a stop so that the shift arm 15 clears the pin 13 when the crank arm 10R is rotated by pedaling.

Figure 5:
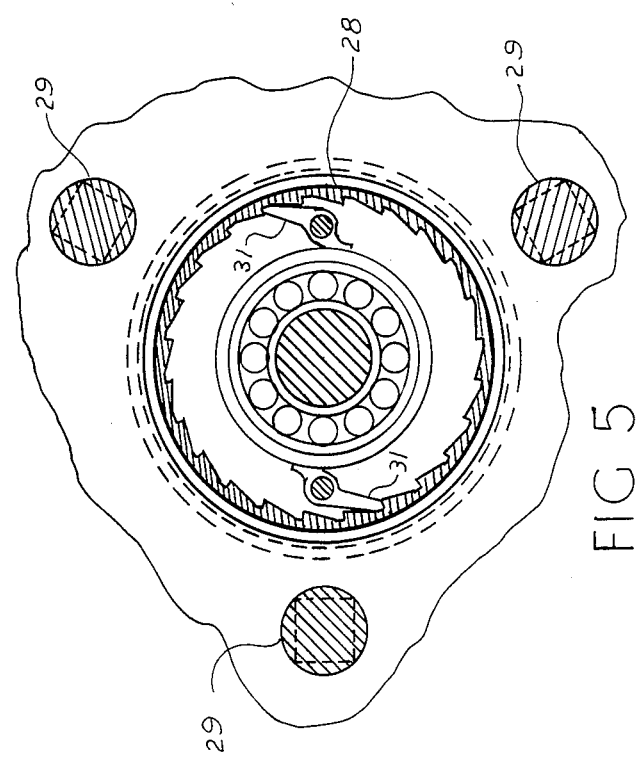
FIG. 5 is a cross sectional view taken along the line 5—5 of FIG. 3.

Referring now to FIG. 3, a slotted pin 29 is installed parallel to the pedal drive shaft 11 in the gear case 3. As shown in FIG. 5, the slotted pin 29 is installed in three locations 120 degrees apart and the left end supported in the gear case 3 is square in a square hole so that the pin 29 is restrained from rotating. The right end of the pin 29 is supported in the gear case closing plate 4, as shown in FIGS. 3 and 8. The left end of an idler shaft 17 is supported on a ball bearing 41 seated on the slotted pin 29. The right end of the idler shaft 17 is supported inside a ball bearing 40 which is seated in the gear case closing plate 4.

Two gears 49 and 50 are rigidly fixed on the idler shaft 17 and are in constant mesh with the drive gears 42 and 43, respectively. A split ring 18 is installed in each of five circumferential cutouts in the idler shaft 17 and the five idler gear 44, 45, 46, 47 and 48 are installed over the split rings 18. The inside diameter of the idler gears is a slip fit on the outside diameter of the idler shaft 17 so that the gears rotate freely relative to the idler shaft.

As shown in FIG. 6, the split ring 18 has four radial projections which key it to the gear installed over it. An idler gear selector 19 has four radial projections which slide in axial tracks in the idler shaft 17. The depth of the tracks in the idler shaft 17 is preferably limited to two thirds its thickness so that they do not impair its torsional integrity. A tooth form on the ends of the projections on the idler gear selector 19 matches an internal tooth form on the split rings 18. The gear selector 19 thus transfers torque from the idler shaft 17 to the gear in the plane of which it is located, while the other four gears slide freely on the idler shaft 17.

As seen in FIGS. 3, 6 and 8, the axial position of the gear selector 19 is controlled by a split collar 20, a flanged bar 32, a cable 22, and a return spring 21 which is installed over the slotted pin 29. The idler gear selector 19 rotates freely between the two halves of the split collar 20. The flanged bar 32 is installed in the slotted pin 29 inside the left half of the split collar 20 with flanges on the ends of the bar 32 engaging the left flange on the split collar 20. The force from the spring 21 is reacted by tension in the cable 22, one end of which is fixed in the flanged bar 32, and the other end of which is clamped in a winch 23 located between the bearings 38 supporting the gear case closing plate 4.

As shown in FIG. 8, the extruded aluminum winch 23 has three axial slots. A cable clamping screw 24, washer 26, and threaded collar 25 are held captive in each of these slots by the gear case closing plate 4 within which the winch 23 rotates. The radius of the winch 23 is chosen so that 90 degrees of winch rotation moves the idler gear selector from a location centered inside gear 44 to one centered inside gear 48, as shown in FIG. 3. Tension in the three actuation cables 22 is maintained by the three return springs 21, and applies a counterclockwise torque to the winch 23, as viewed in FIG. 8. An exploded view of the components for clamping the ends of the cables 22 in the winch 23 is shown in FIG. 8A. The cable is clamped between the screw 24 and the washer 26 by the threaded collar 25. A balancing clockwise torque on the winch 23 is applied by a winch actuation cable 27 which wraps around the outboard end of the winch, passes out through a hole in the gear case closing plate 4, and terminates in a shift assembly 72, as shown in FIG. 2 and in an enlarged view of the left side of the shift assembly 72 shown in FIG. 9.

Referring to the left side view of the shift assembly 61 shown in FIG. 9, the actuation cable 27, on entering the open end of the shift bracket 53, passes through the guide bushing 55, wraps around the cable drum 51, and terminates in the attachment pin 59 in the cable release arm 52, which is joined to the cable drum by the pin 60. Five notches in the shift bracket 53 match the five positions required for the idler gear selector 19. When the handles of the cable drum 51 and the cable release arm 52 are squeezed together, the cable drum can be freely swung around to position the cable attachment pin 59 in any one of the five notches.

Referring again to FIG. 3, the right side of the wheel hub 1 is supported on a ball bearing 39 seated on the gear case closing plate 4. As shown in FIG. 4, the two flats 73 on an integral cylindrical extension of the closing plate 4 engage a slot in the vehicle frame 33 and prevent the gear case from rotating.

The left side of the wheel hub 1 is supported by the wheel hub driving plate 2, which is supported by a ball bearing 36 seated on the pedal drive shaft 11. A free-wheel assembly 28 is supported on a ball bearing 37, also seated on the pedal drive shaft 11. Each of five gears rigidly fixed to the free-wheel assembly 28 is in constant mesh with one of the five idler gears freely rotating on each of the three idler shafts 17. Torque from the free-wheel assembly 28 is transferred to the wheel hub driving plate 2 by a conventional free-wheel ratchet arrangement, as shown in FIG. 5, with two spring loaded dogs 31 mounted in the driving plate 2 engaging cogs in the free-wheel assembly 28.

A vehicle frame interface fitting 34 is supported on a ball bearing 35 seated on a cylindrical extension of the left pedal crank arm 10L. As shown in FIG. 4, locking screws 72 in the vehicle frame 33 engage both the gear case closing plate 4 and the frame interface fitting 34, and prevent the transmission from separating from the frame when the front of the vehicle is lifted off the ground.

28 pitch involute gears were selected for the design example developed to illustrate the present invention. The number of teeth in each gear and the resulting gear ratios are given in the table below. The first number given is the number of teeth in the driving gear (gear 42 or 43) on the drive-gear-carrier 5; the second, the number of teeth in the mating gear (gear 49 or 50) driving the idler shaft 17; the third is the number of teeth in the idler gear on the idler shaft in the plane of which the gear selector 19 is located; and the fourth is the number of teeth in the mating gear on the free-wheel assembly 28.

| Speed | | | Gear Ratio |
|---|---|---|---|
| first | 60/39 | 51/48 | 1.635 |
| second | 60/39 | 54/45 | 1.846 |
| third | 60/39 | 57/42 | 2.088 |
| fourth | 60/39 | 60/39 | 2.367 |
| fifth | 60/39 | 63/36 | 2.692 |
| sixth | 72/27 | 51/48 | 2.833 |
| seventh | 72/27 | 54/45 | 3.200 |
| eighth | 72/27 | 57/42 | 3.619 |
| ninth | 72/27 | 60/39 | 4.102 |
| tenth | 72/27 | 63/36 | 4.667 |

To shift anywhere between the first and fifth speeds, or anywhere between the sixth and tenth speeds, the shift assembly 52 is used, as shown in FIGS. 2 and 9, and the pedals can be in motion or stopped. However, to shift between the fifth and sixth speeds, the pedals must be stopped with the cranks in a horizontal position with the right crank arm 10R facing aft, so that the shift arm 15 can engage the cable actuation pin 13, as described before.

While this invention has been described in terms of a few preferred embodiments, it is realized that persons skilled in the art will, upon reading the written description and studying the drawings, be able to visualize many possible variations and alterations. For example, if three gears were used on the drive-gear-carrier instead of two, with four gears on the idler shaft, a twelve speed transmission would result with the same total number of gears as in the design illustrated. While this would require two pedal stops instead of one to cover the whole range of speeds, some applications might benefit from such a change. The invention should not be considered as limited to the number of speeds, gear ratios, or 28 pitch gears illustrated.

It is therefore intended that the following appended claims be interpreted as including all such variations, alterations, and modifications as fall within the true scope and spirit of the present invention.

I claim:

1. In a pedal powered vehicle including a frame, a driving wheel with a central hub, a pedal drive shaft on the axis of said wheel and mounted in bearings for concentric rotation with said hub, an improved multiple speed transmission located within said hub and comprising:

a gear case having a closing plate fixed to said frame;
   a drive-gear-carrier fixed on said pedal drive shaft for rotation therewith;
   multiple drive gears rotatably mounted on said drive-gear-carrier;
   drive gear locking means operative for selectively locking any one of said multiple drive gears to said drive-gear-carrier;
   multiple idler shafts rotatably mounted in said gear case, positioned parallel to and equally spaced around said pedal drive shaft;
   gears fixed on each of said multiple idler shafts in mesh with each of said multiple drive gears;
   multiple idler gears rotatably mounted on each of said multiple idler shafts;
   idler gear locking means operative for selectively locking any one of said multiple idler gears to its respective idler shaft, simultaneously with corresponding ones of said multiple idler gears on the others of said multiple idler shafts; and
   free-wheel means having multiple gears in mesh with said multiple idler gears, respectively, and supported for concentric rotation about said pedal drive shaft; and
   free-wheel ratchet means coupling said free-wheel means with said hub for driving said hub.

2. A transmission according to claim 1 wherein one end of said hub is rotatably supported on a cylindrical extension of said gear case closing plate and wherein the other end of said hub is supported by said free-wheel ratchet means, and wherein said free-wheel ratchet means is rotatably supported on said pedal drive shaft.

3. A transmission according to claim 1 wherein said transmission includes left and right pedal crank arms for rotating said pedal drive shaft, said left and right crank arms including integral cylindrical extensions defining seats, respectively; and including a pair of ball bearings carried by said seats, and further including a frame interface fitting carried by one of said ball bearings, with said cylindrical extension of said gear case closing plate carried by the other of said ball bearings, said frame interface fitting and said cylindrical extension being adapted to receive and support a portion of said frame.

4. A transmission according to claim 1 wherein said drive gear locking means includes a plurality of circumferential grooves in said drive-gear-carrier; a plurality of split rings installed in said circumferential grooves, respectively; said multiple drive gears receiving said split rings; external teeth on said split rings locking said split rings to said drive gears, respectively, for rotation therewith; a drive gear selector keyed to said drive-gear-carrier for rotation therewith; internal teeth on said split rings keying said split rings to said drive gear selector; axial grooves in said drive-gear-carrier permitting axial movement of said drive gear selector relative to said split rings for engaging one of said split rings and locking the associated one of said drive gears to said drive-gear-carrier; and wherein said pedal drive shaft includes a first cable means and said first cable means is operative to control the axial position of said drive gear selector 5. A transmission according to claim 4 wherein said transmission includes left and right pedal crank arms for rotating said pedal drive shaft and wherein said first cable means includes a bar receiving said gear selector and axially slidable in a slot through said pedal drive shaft; a compression spring biasing said bar in an inboard direction; a mounting block slidably carried in one of said pedal crank arms and connected by a cable to said bar; a positioning pin carried by said mounting block and extending inboard from said one of said pedal crank arms having a plurality of radially spaced retaining notches for receiving said positioning pin; and including positioning means for moving said positioning pin between said spaced retaining notches.

6. A transmission according to claim 1 wherein said idler gear locking means includes a plurality of circumferential grooves in said idler shaft; a plurality of split rings installed in said circumferential grooves, respectively; said multiple idler gears receiving said split rings; external teeth on said split rings locking said split rings to said idler gears, respectively, for rotation therewith; an idler gear selector keyed to said idler shaft for rotation therewith; internal teeth on said split rings keying said split rings to said idler gear selector; axial grooves in said idler shaft permitting axial movement of said idler gear selector relative to said split rings for engaging one of said split rings and locking the associated one of said idler gears to said idler shaft; a slotted pin located on the centerline of said idler shaft and fixed in said gear case; and wherein said slotted pin includes a second cable means and said second cable means is operative to control the axial position of said idler gear selector.

7. A transmission according to claim 6 wherein said second cable means includes a split collar receiving said idler gear selector and wherein said idler gear selector is freely rotatable within said split collar; a compression spring surrounding said slotted pin and biasing said split collar in an outboard direction; a flanged bar receiving said split collar and axially slidable in said slotted pin; a winch positioned for rotation inside said cylindrical extension of said gear case closing plate; a cable coupling said flanged bar in said slotted pin located on the centerline line of each of said multiple idler shafts with said winch; and a shift assembly located on said frame with a cable coupling said shift assembly with said winch, for rotating said winch to selectively and simultaneously position each of said idler gear selectors within said multiple idler shafts.

8. A transmission according to claim 1 wherein said driving wheel is the front wheel and said vehicle is a rear wheel steer, recumbent tricycle having a seat; a post mounted in axially spaced bearings in said frame and located under said seat; handlebars clamped to said post; a pair of rear wheels; a steering knuckle on each of said rear wheels; a strut connecting each of said steering knuckles with said handlebars; and said transmission is located in said front wheel.

9. In a pedal powered vehicle including a frame, a driving wheel with a central hub, a pedal drive shaft on the axis of said wheel and mounted in bearings for concentric rotation with said hub, an improved multiple speed transmission located within said hub and comprising:

a gear case having a closing plate fixed to said frame;
a drive gear fixed on said pedal drive shaft for rotation therewith;
multiple idler shafts rotatably mounted in said gear case, positioned parallel to and equally spaced around said pedal drive shaft;
a gear fixed on each of said multiple idler shafts in mesh with said drive gear;
multiple idler gears rotatably mounted on each of said multiple idler shafts;
idler gear locking means operative for selectively locking any one of said multiple idler gears to its respective idler shaft, simultaneously with corresponding ones of said multiple idler gears on the others of said multiple idler shafts;
free-wheel ratchet means coupling said free-wheel means with said hub for driving said hub.

10. A transmission according to claim 9 wherein said idler gear locking means includes a plurality of circumferential grooves in said idler shaft; a plurality of split rings installed in said circumferential grooves, respectively; said multiple idler gears receiving said split rings; external teeth on said split rings locking said split rings to said idler gears, respectively, for rotation therewith; an idler gear selector keyed to said idler shaft for rotation therewith; internal teeth on said split rings keying said split rings to said idler gear selector; axial grooves in said idler shaft permitting axial movement of said idler gear selector relative to said split rings for engaging one of said split rings and locking the associated one of said idler gears to said idler shaft; a slotted pin located on the centerline of said idler shaft and fixed in said gear case; and wherein said slotted pin includes a second cable means and said second cable means is operative to control the axial position of said idler gear selector.

11. A transmission according to claim 8 wherein said driving wheel is the front wheel and said vehicle is a front wheel drive, rear wheel steer, recumbent tricycle including a seat; a post mounted in axially spaced bearings in said frame and located under said seat; handlebars clamped to said post; a pair of rear wheels; a steering knuckle on each of said rear wheels; a strut connecting each of said steering knuckles with said handlebars; and said transmission is located in said front wheel.

* * * * *